INVENTORS
P. H. BRACE
T. H. GRAY
BY
ATTORNEY

Patented May 23, 1950

2,508,466

UNITED STATES PATENT OFFICE 2,508,466

METHOD OF MANUFACTURING LINED METAL TUBES

Porter H. Brace, Forest Hills, and Theodore H. Gray, Pittsburgh, Pa., assignors to Westinghouse Electric Corporation, East Pittsburgh, Pa., a corporation of Pennsylvania Application October 2, 1944, Serial No. 556,754

8 Claims. (Cl. 29—188)

This invention relates to the manufacture of composite tubes, and more particularly, to steel tubing lined with molybdenum.

The principal object of our invention, generally considered, is to manufacture tubing or cylindrical parts of non-refractory metal, such as steel, as for toughness, lined with refractory metal, such as molybdenum, as for protection against chemical attack.

Another object of our invention is to make molybdenum-lined steel tubing or cylinders by placing a molybdenum tube within a preferably seamless steel tube, thoroughly cleaning the combination, and inserting it within the well-cleansed bore of a steel carrier tube, and brazing the parts of the combination together.

A further object of our invention is the manufacture of relatively thick steel cylinders lined with molybdenum, in which the combination of a steel tube with a one-seam molybdenum lining therein is inserted in a relatively thick-walled steel cylinder or carrier, and all three parts simultaneously brazed together, preferably using a copper-base alloy.

Other objects and advantages of the invention, relating to the particular arrangement and construction of the various parts, will become apparent as the description proceeds.

Referring to the drawings.

The number of chemical and corrosive resistant materials has been increased by the addition of molybdenum in the form of sheets, strips, and tubes now available. One of the prime applications of molybdenum is in the shape of tubes inserted within steel carriers to form molybdenum lined tubes resistant to corrosive gases and liquids and with the ability to withstand high internal stresses. The problems encountered in this process are first, providing a solid joint between the steel and the molybdenum and secondly, in providing a joint strong enough to resist high internal pressures without displacement of the molybdenum tube.

Our solution to the problem of joining the steel and molybdenum consists in applying a process called brazing to the joining of an external steel carrier to an internal molybdenum tube. This is done in two ways.

1. The molybdenum in the form of a one seam tube, spirally wound tube, or any other type of formed tube, is inserted within a second steel tube by any conventional method such as drawing over a mandrel. This composite tube is then thoroughly cleaned and inserted within the well cleansed bore of the steel carrier. The fit of the intermediate tube should be tapered and some pressure applied to insert the composite tube in place. The assembly is then mounted vertically within a furnace muffle or tube through which a protective atmosphere may be passed, Fig. 1.

The brazing alloy is fed to the joints from the bottom of the assembly and is spread throughout the joints by capillary action. Because of the high strength, imparted to the brazed joint, a preferred brazing alloy to be used for this application has the following composition, 93% Cu, 6% Ni and 1% Si. The melting point is 1080° C. and the brazing temperature is 1100° C.

The brazing is done by heating the assembly to 1100° C. by inductive heating in a protective atmosphere of disassociated ammonia so that no fluxing is required. As soon as the alloy becomes molten it spreads throughout the joints and fills them. By slowly lowering the heating coil the molten alloy can be solidified from top down to prevent shrinkage cavities from forming. The tapered fit of the intermediate steel tube in conjunction with vertical pressure enables the close fit to be maintained during the brazing operation.

Figure 1:
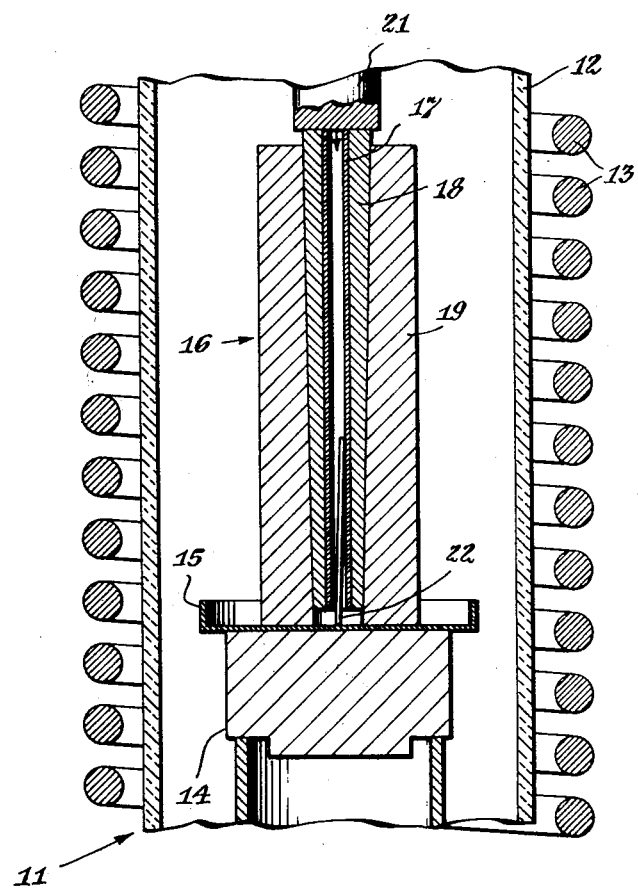
Fig. 1 is a view of a composite tube combination after placing it in a brazing furnace with a desired amount of brazing alloy.

2. The second method consists of inserting the molybdenum tube directly into the steel carrier without an intermediate steel tube. The brazing procedure is then as described in the previous paragraphs and as is shown in Fig. 1 except that the intermediate steel tube is omitted.

The advantages of using an intermediate steel tube are two fold. First, by tapering the intermediate tube and the bore of the steel carrier, a close fit is maintained during brazing. Second, the molybdenum tube is inserted much more readily into the steel carrier if it is backed up by an intermediate steel tube. The second method is advantageous from the standpoint of requiring less processing.

Referring to the drawings in detail, like parts being designated by like reference characters, there is shown a portion of an induction furnace 11, the outer envelope or casing of which comprises a tube 12, preferably formed of silica or other similar refractory material, said tube being surrounded by a coil 13 in which high-frequency power is employed for inductively heating material contained in said furnace. The top and bottom of the tube 12 may be closed in any desired manner by suitable refractory material.

Inside the furnace is a suitable support 14 upon the top of which rests a pan or tray 15, desirably formed of steel. Upon this pan is placed the assembly 16 which is to be united by brazing. This assembly may comprise the inner refractory metal tube 17 formed as previously described, that is for example, by bending a sheet of molybdenum, or other desired refractory material, such as tungsten, to form a one-seamed tube, which tube is desirably slightly tapered externally and forced within a second tube 18 of steel or the like, desirably slightly tapered internally to correspond with the taper of the tube 17, by any conventional method.

The composite tube 17—18 is then thoroughly cleaned, as by means of carbon-tetrachloride or other cleansing agent, and then inserted within the well-cleansed bore of the preferably steel carrier 19. The outer surface of the member 18 may be slightly tapered and the bore of the carrier 19 correspondingly tapered so that a tight fit therebetween may be secured by applying pressure on the composite tube 17—18 to force it into the tube 19, as by means of the plunger 21.

We stand the assembly vertically in the supporting iron tray 15 in the furnace 11, the interior of which contains a protective atmosphere of reducing gas, such as dissociated ammonia or other gas with hydrogen as its active ingredient. The brazing alloy is placed within the bore of the tube 17—18—19 in the form of a rod 22. The tube is heated by induction, as by means of coil 13, so that the alloy is the last portion of the assembly to reach brazing temperature, thus insuring rapid flow into all portions of the joints when the alloy melts.

As the alloy melts, it accumulates in the supporting tray 16 and then flows up into all of the joints between the tubes 17, 18, and 19 by capillary action, when it reaches the desired brazing temperature of about 1100° C. After this has occurred, the heating coil 13 is lowered slowly to allow the alloy in the joints to solidify from the top down in order that the shrinkage of the solidifying alloy will be replaced from tray 15 of molten metal. After the heating coil has been lowered to the point where all of the alloy has solidified, the assembly is allowed to cool and is then removed.

The heating of the assembly requires a definite procedure to remove the adsorbed gases and moisture before the brazing occurs. This procedure consists in previously heating the assembly slowly to a temperature of about 1000° C. and holding it at this temperature for about ½ hour before elevating it to the brazing temperature of about 1100° C. The height to which capillary action will fill the joints with brazing alloy is dependent on the spacing of the parts and the purity of the protective atmosphere, which is desirably prepared with a dew point below —40° C. The height ranges from 10 inches to a theoretical maximum of 35 inches, with a spacing of the parts of .001 inch.

Figure 2:
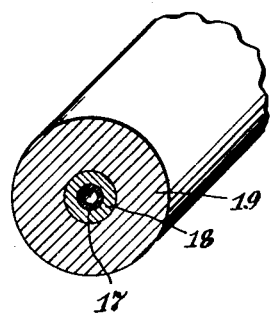
Fig. 2 is a perspective view of the composite tube after brazing and removal from the furnace.

Fig. 2 shows in perspective, a composite steel tube with a molybdenum lining brazed in place, as in a furnace such as illustrated in Fig. 1.

The advantage of our invention consists in producing steel-molybdenum assemblies containing non-corrosive molybdenum tubes bonded firmly to steel carriers by a brazing process which provides a strong completely filled joint between the steel and the molybdenum. A further advantage is that the corrosive gases and liquids are prevented from contacting the steel liner by the intervening brazing alloy. A third advantage of our invention is the production of high strength composite assemblies of steel and molybdenum which can withstand high internal pressures while at the same time provide a high resistance to corrosive chemical action both at room temperature and at elevated temperatures.

Although preferred embodiments of our invention have been disclosed, it will be understood that modifications may be made within the spirit and scope of the appended claims.

We claim:

1. The method of making a non-refractory metal tube lined with refractory metal, comprising forming a sheet of said refractory metal into a hollow cylinder, thoroughly cleaning and fitting said formed sheet tightly into the well-cleansed bore of a tube of said non-refractory metal, placing said formed sheet and tube vertically on a supporting tray within the muffle of an induction furnace containing a protective atmosphere, placing a rod of brazing alloy within the bore of the tube and sheet, said rod being large enough to provide material to completely fill the space between the adjacent surfaces of said tube and sheet, heating said assembly until the alloy melts and runs down into the supporting tray and then up into said space by capillary action, gradually lowering the heating means to cause the alloy in said space to solidify from the top down, in order that the shrinking of the solidifying alloy will be replaced from the molten alloy in the tray, and removing said assembly from the furnace after the alloy has solidified and the parts cooled.

2. The method of making a non-refractory metal tube lined with refractory metal, comprising bending a sheet of said refractory metal into hollow cylindrical form, thoroughly cleaning and fitting said bent sheet tightly into the well-cleansed bore of a tube of said non-refractory metal, placing said bent sheet and tube vertically on a supporting tray within the muffle of an induction furnace containing a protective atmosphere, placing a rod of brazing alloy within the bore of the tube and bent sheet, said rod being large enough to provide material to completely fill the space between the adjacent surfaces of said tube and bent sheet, heating said assembly until the alloy melts and runs down into the supporting tray and then up into said space by capillary action, and gradually lowering the heating means to cause the alloy in said space to solidify from the top down, in order that the shrinking of the solidifying alloy will be replaced from the molten alloy in the tray.

3. The method of making a molybdenum-lined steel tube, comprising bending a sheet of molybdenum into hollow cylindrical form, thoroughly cleaning and fitting said bent sheet tightly into the well-cleansed bore of a steel tube, placing said bent sheet and tube vertically on a supporting tray within the muffle of an induction furnace containing a protective atmosphere, placing a rod of copper-nickel-silicon brazing alloy within the bore of said sheet, said rod being large enough to provide material to completely fill the space between the adjacent surfaces of said tube and bent sheet, heating said assembly until the alloy melts and runs down into the supporting tray and then up into said space by capillary action, gradually lowering the heating means to cause the alloy in said space to solidify from the top down in order that the space left by the shrinking of the solidifying alloy will be filled from the molten alloy in the tray, and removing said assembly from the furnace after the alloy has solidified and the parts cooled.

4. The method of making a non-refractory metal tube lined with refractory metal, comprising forming a sheet of said refractory metal into a hollow cylinder, fitting said formed sheet tightly into a tube of said non-refractory metal, thoroughly cleaning and inserting said tube and sheet inside the well-cleansed bore of a hollow cylindrical carrier, placing said sheet, tube and carrier vertically on a supporting tray within the muffle of an induction furnace containing a protective atmosphere, placing a rod of brazing alloy within the bore of the tube and sheet, said rod being large enough to provide material to completely fill the space between the adjacent surfaces of said tube and bent sheet, heating said assembly until the alloy melts and runs down into the supporting tray and then up into said space by capillary action, gradually lowering the heating means to cause the alloy in said space to solidify from the top down, in order that the shrinking of the solidifying alloy will be replaced from the molten alloy in the tray, and removing said assembly from the furnace after the alloy has solidified and the parts cooled.

5. The method of making a non-refractory metal tube lined with refractory metal, comprising bending a sheet of said refractory metal into hollow cylindrical form, fitting said bent sheet tightly into a tube of said non-refractory metal, thoroughly cleaning and inserting said tube and bent sheet inside the well-cleansed bore of a hollow cylindrical carrier, placing said bent sheet, tube and carrier vertically on a supporting tray within the muffle of an induction furnace containing a protective atmosphere, placing a rod of brazing alloy within the bore of the tube and bent sheet, said rod being large enough to provide material to completely fill the space between the adjacent surfaces of said tube and bent sheet, heating said assembly until the alloy melts and runs down into the supporting tray and then up into said space by capillary action, and gradually lowering the heating means to cause the alloy in said space to solidify from the top down, in order that the shrinking of the solidifying alloy will be replaced from the molten alloy in the tray.

6. The method of making a molybdenum-lined steel tube, comprising bending a sheet of molybdenum into hollow cylindrical form, fitting said molybdenum part tightly into a steel tube, thoroughly cleaning and inserting said molybdenum-lined tube into the well-cleansed bore of a hollow cylindrical carrier, placing said molybdenum-lined tube and carrier vertically on a supporting tray inside of an induction furnace containing a protective atmosphere, placing a rod of copper-nickel-silicon brazing alloy within the bore of the tube and bent sheet, said rod being large enough to provide material to completely fill the space between the adjacent surfaces of said tube and bent sheet, heating said assembly until the alloy melts and runs down into the supporting tray, and then up into said space by capillary action, gradually lowering the heating means in said space to cause the alloy in the joints to solidify from the top down, in order that the shrinking of the solidifying alloy will be replaced by the molten alloy in the tray, and removing said assembly from the furnace after the alloy has solidified and the parts cooled.

7. The method of making a molybdenum-lined steel tube, comprising bending a sheet of molybdenum into hollow cylindrical form, thoroughly cleaning and fitting said bent sheet tightly into the well-cleansed bore of a steel tube, placing said bent sheet and tube vertically on a supporting tray within the muffle of an induction furnace containing a protective atmosphere, placing a rod of copper-nickel-silicon brazing alloy within the bore of said sheet, said rod being large enough to provide material to completely fill the space between the adjacent surfaces of said tube and bent sheet, heating said assembly slowly to a temperature of about 1000° C. and holding it at this temperature for about ½ hour, elevating the temperature to about 1100° C. until the alloy melts and runs down into the supporting tray and then up into said space by capillary action, gradually lowering the heating means to cause the alloy in said space to solidify from the top down in order that space left by the shrinking of the solidifying alloy will be filled from the molten alloy in the tray, and removing said assembly from the furnace after the alloy has solidified and the parts cooled.

8. The method of making a non-refractory metal tube lined with refractory metal, comprising bending a sheet of refractory metal into a hollow cylinder, thoroughly cleaning and fitting said bent sheet tightly into the well-cleaned bore of a tube of non-refractory metal, placing said bent sheet and tube so that one end rests on supporting means within the muffle of a furnace containing a protective atmosphere, placing enough brazing alloy on said supporting means to provide material to completely fill the space between the adjacent surfaces of said tube and bent sheet, heating said assembly until the alloy melts and then runs up into said space by capillary action, gradually lowering the heating means to cause the alloy in said space to solidify from the top down, in order that the shrinkage of the solidifying alloy will be replaced from the molten alloy in the supporting means, and removing said assembly from the furnace after the alloy has solidified and the parts cooled.

PORTER H. BRACE.
THEODORE H. GRAY.

REFERENCES CITED

The following references are of record in the file of this patent:

UNITED STATES PATENTS

| Number | Name | Date |
| --- | --- | --- |
| 235,834 | White | Dec. 21, 1880 |
| 507,974 | Crosby | Oct. 31, 1893 |
| 1,189,194 | Eldred | June 27, 1916 |
| 1,387,157 | Jones | Aug. 9, 1921 |
| 1,582,407 | King | Apr. 27, 1926 |
| 1,614,501 | Stoekle | Jan. 18, 1927 |
| 1,618,611 | Tront | Feb. 22, 1927 |
| 1,652,164 | Coyer | Dec. 13, 1927 |
| 1,882,151 | Lagerblade | Oct. 11, 1932 |
| 2,060,034 | Chandler | Nov. 10, 1936 |
| 2,084,207 | Lindquist | June 15, 1937 |
| 2,087,185 | Dillon | July 13, 1937 |
| 2,210,338 | Quarnstrom | Aug. 6, 1940 |
| 2,255,472 | Quarnstrom | Sept. 9, 1941 |
| 2,279,831 | Lempert et al. | Apr. 14, 1942 |
| 2,315,294 | Stewart | Mar. 30, 1943 |
| 2,380,107 | Hobrock | July 10, 1945 |

FOREIGN PATENTS

| Number | Country | Date |
| --- | --- | --- |
| 286,823 | Great Britain | Mar. 15, 1928 |
| 513,749 | Great Britain | Oct. 20, 1939 |

OTHER REFERENCES

The Best Joint Designs for Silver Alloy, Oct. 17, 1941, by Handy and Harman, 82 Fulton St., N. Y. C., N. Y. (Copy in Div. 14.)